Patented May 15, 1934

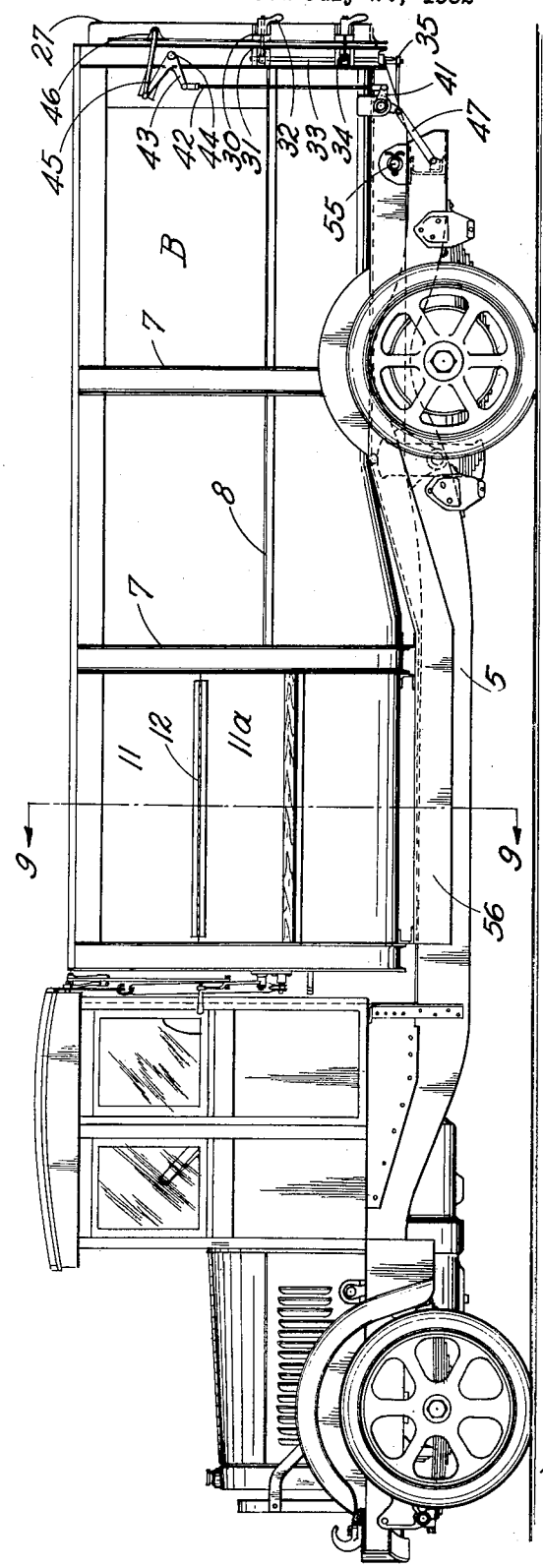

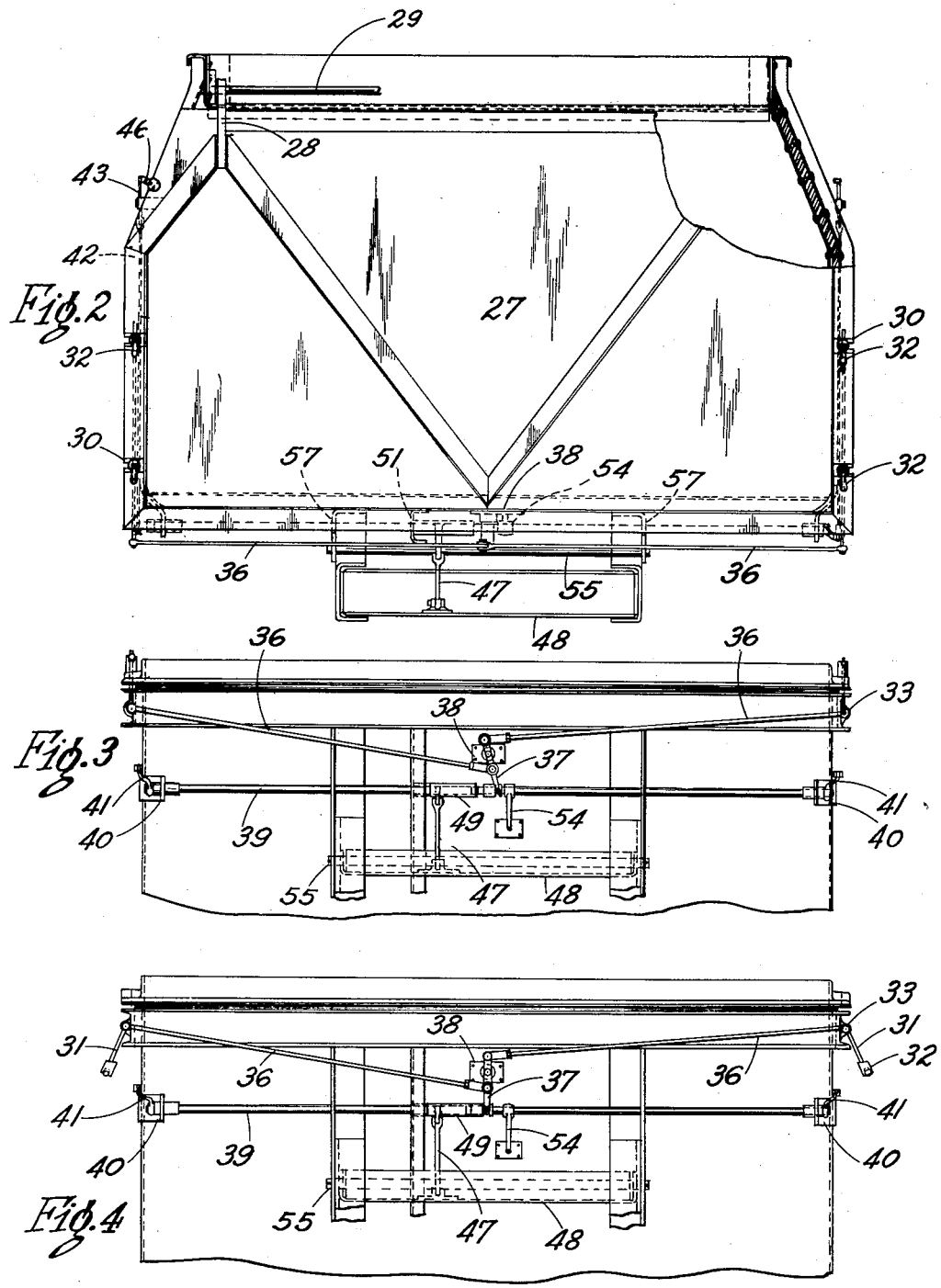

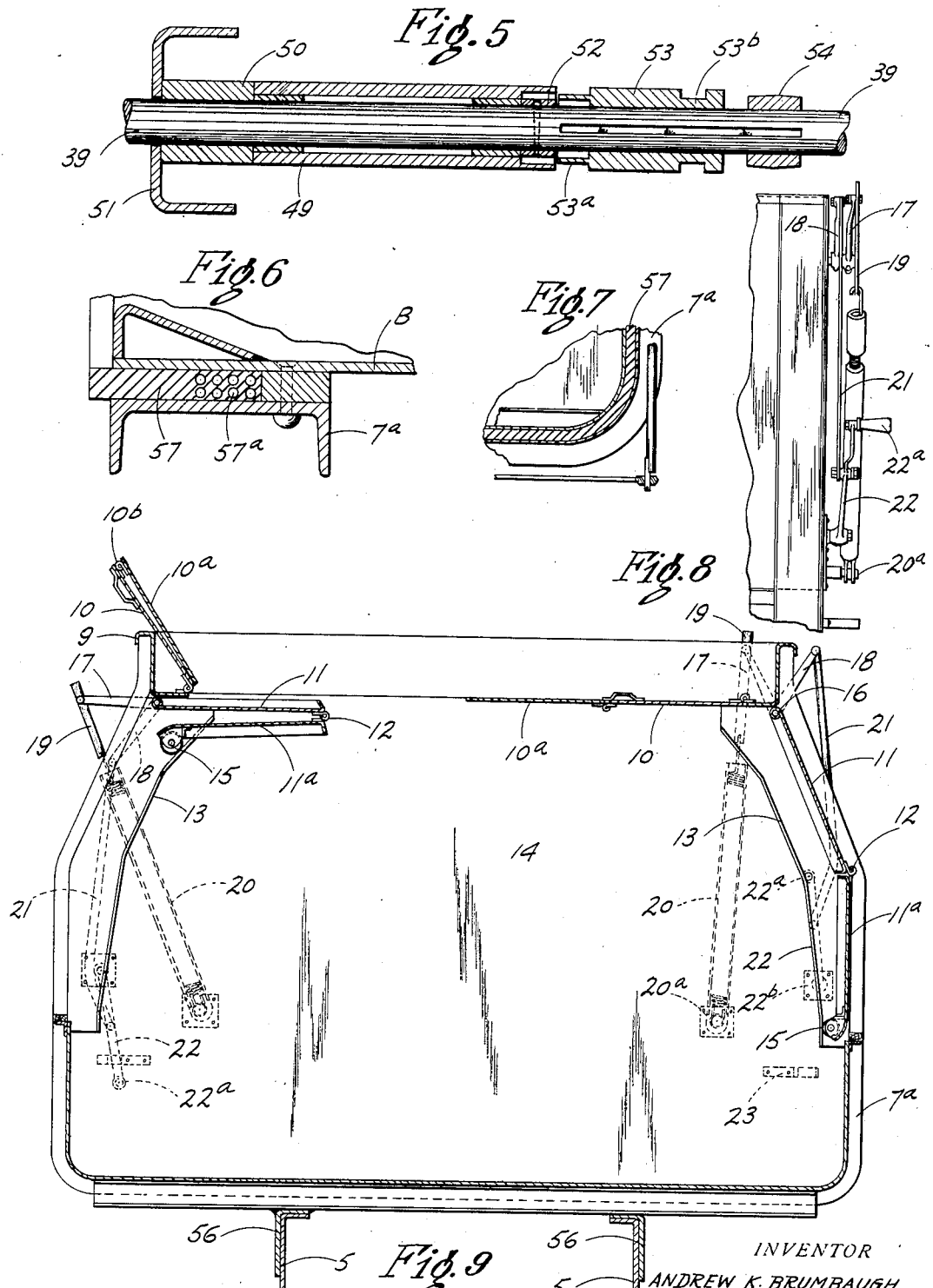

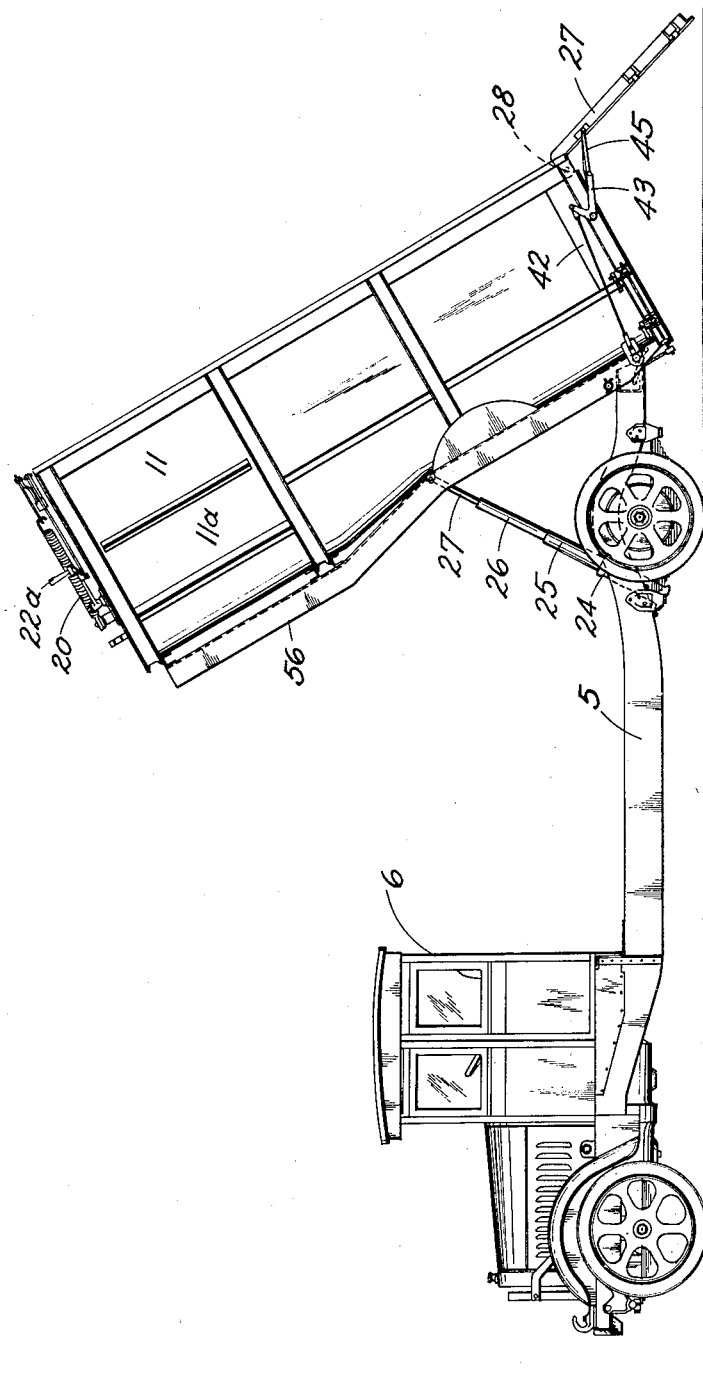

1,958,908

UNITED STATES PATENT OFFICE 1,958,908

DUMP TRUCK

Andrew K. Brumbaugh, Cleveland, Ohio, assignor to The White Motor Company, Cleveland, Ohio, a corporation of Ohio Application July 22, 1932, Serial No. 624,036

7 Claims. (Cl. 298—23)

This invention relates to trucks broadly, and more specifically to trucks of the self-dumping type in which the body is tiltable to an inclined plane longitudinally of the truck to dump the contents thereof from the rear end of the body.

The principal object of the invention is to provide a truck which will facilitate the handling of certain materials, particularly such materials as garbage, snow, ashes and like refuse.

With this object in view, provision has been made for loading the truck body, almost to its capacity, from a point well down along the sides thereof, while keeping the top closed. Thus, for example, when using the truck for collecting garbage, considerable manual labor incident to lifting heavy garbage cans is eliminated while at the same time obnoxious odors are to a large extent prevented from escaping into the surrounding atmosphere.

The rear door or end gate of the truck is preferably connected with an opening mechanism which when the door is unlatched is automatically rendered operative to open the door as the body is hoisted, and which when the door is latched is automatically rendered inoperative.

Provision has been made for sealing the rear dumping door against leakage of fluid, and the door controls are constructed to facilitate the opening and closing operation. In no instance is it necessary for an attendant to come into direct contact with the material being handled, and the truck as a whole has been supplied with features which render it a distinct advance in the industry with which it is concerned.

To obtain a better understanding of the features of novelty and advantage resident in the improved truck, reference is made to the following description taken in conjunction with the drawings, wherein:—

Figure 1 is a view in side elevation of a truck illustrating the features of the invention;

Fig. 2 is a rear end elevation, partly broken away, of the truck of Fig. 1;

Figs. 3 and 4 are bottom plan views of the rear end of the truck, showing the control mechanism for the rear door in alternate engaged and disengaged positions;

Fig. 5 is an enlarged longitudinal sectional view of a type of clutch which may be used with said control mechanism;

Figs. 6 and 7 are detail fragmentary sectional views taken through the frame of the body adjacent the rear door, showing a resilient sealing and cushioning means for said door;

Fig. 8 is an enlarged view of the control mechanism for the front side doors;

Fig. 9 is an enlarged transverse section taken substantially on the line 9—9, Fig. 1; and Fig. 10 is a view similar to Fig. 1, showing the truck body in dumping position.

The running gear, chassis and power unit of the truck may be of conventional design, and hence these parts are not referred to in detail except insofar as they may be concerned with the invention. Referring to Fig. 1, the chassis is indicated at 5, and has mounted at the forward extremity thereof a cab 6 for the driver of the truck.

The body may be constructed in any preferred manner and of any material suitable for the purpose. In the example shown, the body, generally indicated at B, is formed of sheet metal reinforced by braces 7 and 8. The top edge of the body is provided with a drop frame member or members 9 to which longitudinally-extending lids or covers comprising sections 10, 10a are hinged. These sections are hinged in a manner such that they may be turned back against the top frame 9 and serve as sideboards to increase the load capacity of the body as shown on the left-hand side of Fig. 9. For instance, in hauling light materials such as leaves, snow, etc., either one or both sections 10, 10a may be utilized if desired, a single-jointed hinge 10b being used for hinging the sections together. This arrangement greatly increases the normal load capacity in terms of volume of the body. It will be obvious that any practical number of hinged sections could be employed, although two sections of the relative width shown would ordinarily be sufficient. Also the cover sections may be arranged in sets longitudinally of the body, or only a portion of the body provided with these hinged sections 10, 10a, to accommodate particular service conditions.

The body may be loaded from either side or top. Where the material is comparatively heavy and is to be lifted manually, considerable labor may be saved by utilizing the side door construction particularly shown in Figs. 8 and 9. The front extremity of the body is provided with side doors which are formed in sections 11, 11a hinged at 12. These doors are of the sliding type, and to accommodate this type of door, trackways or guides 13 are secured to the end wall 14 of the body and the adjacent brace member 7, and each section 11a is provided with rollers 15 adapted to travel in said guides. Each section 11 has its upper edge beaded over and rigidly secured to a rod or pin 16 which has secured on the forward end thereof crank arms 17 and 18. The arm 17 is pivotally connected to a connector 19 which is attached to an adjustable spring assembly 20, the latter being pivotally anchored at its lower end on a pin 20a secured to the end wall 14 of the truck body; and the arm 18 is pivotally connected to a bowed rod 21 which extends downwardly and is pivotally connected to a lever 22 provided with a handle 22a. Lever 22 is pivotally anchored at 22b to the end wall 14.

The left-hand side of Fig. 9 shows the positions of the above parts when the doors are open, and the right-hand side shows their positions when the doors are closed. When the lever 22 is turned to the position shown at the left-hand side of Fig. 9, the crank arms 17, 18 turn the rod 16 and the doors collapse inwardly, the spring 20 holding them under tension in open position after passing dead center with the handle lever 22 snapped against the stop 23.

The preferred method of loading when using the side doors is to hoist the truck body after loading the front end up to a certain point, or to a point where capacity is reached with the doors open, and then hoist the truck and slide the material back to the rear end. This is of particular advantage in collecting garbage where the labor incident to lifting the containers is unusually heavy. Since the side door opening is comparatively low, the labor required to load from the side is considerably less than would be required to load from the top of the body.

The hoisting mechanism may be of conventional construction, that here shown being of the hydraulic type and comprising pivotally mounted pressure cylinders 24 and telescoping piston cylinders 25 and 26, and piston 27. Cylinder 24 may be connected with a pressure tank or reservoir in turn connected with a pump in a manner not shown but well understood in the art and forming no part of the present invention, the hoisting operation being under ready control of the driver of the truck.

The rear end gate or door is preferably opened and closed by positively acting means brought into operation through hoisting of the truck body. When the door is latched, the said means is automatically disconnected from the door and the body may be raised and lowered at will with the door remaining closed. When the door is unlatched, the said means is automatically rendered operative and the door will open as the body rises, a type of construction for accomplishing this desirable end being illustrated in detail in Figs. 2, 3, 4 and 5 taken in conjunction with Figs. 1 and 10.

Referring to these figures, the door or end gate is provided with hinge or suspension brackets 28 and suspended from a rod or shaft 29 journaled at opposite ends in the rear end frame of the body B. The sides of the door are provided with slotted latch lugs 30 in which threaded latch pins 31 are adapted to enter and be clamped in latched position by handle nuts 32. The latch pins 31 are secured on upright shafts 33 which are journaled in brackets 34 at the rear sides of the body B. The lower ends of the shafts 33 are provided with cranks 35 which are pivotally connected to link rods 36, note Figs. 3 and 4. The inner ends of rods 36 are pivotally connected to a clutch fork or yoke 37 which is fulcrumed in a bearing bracket 38 fixed to the bottom of the body B.

When an operator or attendant unscrews the nuts 32 and swings the latch pins 31 outwardly to unlatch the door or end gate, the shafts 33 are rotated and the clutch fork or yoke 37 is actuated through the link rods 36.

Clutch fork 37 acts on a clutch assembly which is operatively mounted in connection with a cross-shaft 39, the latter being mounted at opposite ends in bearing brackets 40 fixed to opposite sides of the body B. Each end of the shaft 39 has fixed thereon a crank 41. The end of each bell crank 41 is pivotally connected to a link rod 42 which in turn is pivotally connected to the one end of a bell crank 43, fulcrumed or pivotally anchored at 44 in the side of the body B, the opposite end of crank 43 being connected by a link 45 with a bracket 46 fixed to the door 27.

The shaft 39 is turned through the tilting movement of the truck body, and said shaft is operatively connected with the rear end of the chassis 5 by means of a yoke link 47, note particularly Figs. 3 and 4, which is pivotally anchored at one end on a cross frame member 48 and at its opposite end is pivotally connected to a clutch sleeve 49, shown in detail in Fig. 5. The clutch shown to obtain the desired result is illustrative only and may be varied in structural details within the scope of the invention. Sleeve 49 is held against lateral shifting movement at one end by means of bushing 50 and bracket 51 and at its opposite end by bushing 52. A sliding sleeve 53 provided with clutch fingers 53a is also mounted for spline-sliding movement on shaft 39 and is formed with a neck 53b for the fork 37. A steadying bracket 54 is provided for the shaft 39 adjacent the clutch assembly just described.

The body is adapted to tilt on a shaft 55 mounted in the brackets on the chassis 5. Extending longitudinally of the body are beams 56 which engage the chassis 5 and prevent lateral displacement of said body as well as guide the same during the raising and lowering operation.

Means for cushioning and for sealing the door against leakage are provided as shown in detail in Figs. 6 and 7, said means consisting of a resilient insert 57, of material such as rubber, adapted to be positioned between the rear body brace 7a and the body proper B and formed with a plurality of holes 57a to facilitate and localize the compression of the member. Fig. 6 is enlarged relatively to Fig. 7 and shows how a portion of the insert projects beyond the frame when the door is open. When the door is closed, the face of the insert is pressed tightly against the door in consequence of being compressed.

Fig. 3 shows the door closed and the clutch released. When in this position, the body B may be raised and lowered at will without opening the door, since the clutch sleeve 49 will then rotate freely on shaft 39. Fig. 4 shows the latch pins 31 swung outwardly and the door unlatched. This movement throws the clutch sleeve 53 into engagement with the sleeve 49 and the door will be opened as the body rises to an inclined plane, note Fig. 10, due to the fact that sleeve 53 is splined to shaft 39 and sleeve 49 is held stationary with respect to the chassis by the anchor link 47.

It will be noted that the door may be adjusted to open to any desired point by adjusting the connecting linkage, or the throw of the actuating parts. This is an advantage over doors which depend upon gravity for their opening movement as the body rises, since the body may be raised to a relatively sharp angle with ample ground clearance for the door, thereby ensuring dumping and clearance of the dumped material as the truck moves on.

While some of the advantages of the improved truck have been set forth herein, it will be understood that there are numerous important advantages not mentioned, and also that variations in structure and mode of operation may be adopted to conform to individual requirements and uses without departing from the scope of the invention as defined in the appended claims.

What I claim is:—

1. A truck comprising a chassis, a body mounted on said chassis, a door at the rear end of said body, means for hoisting said body to unload material from the latter through the rear door, latch means for said door, and means actuated through relative movement between the body and chassis for opening said door, said door opening means being rendered operative through actuation of said latch means.

2. A truck comprising a chassis, a tiltable body mounted on said chassis, a rear end door for said body, latching mechanism for said door, means for hoisting said body to dump material from the rear end thereof when said door is open, means operated through hoisting of said body for opening said door, and a clutch under the control of said latching mechanism for rendering said door opening mechanism operative.

3. A truck comprising a chassis, a tiltable body mounted on said chassis, means for hoisting said chassis to dump material therefrom through the rear end thereof, a door for said rear end, positively acting means operated through hoisting of said body for opening said door, latching mechanism for clamping said door in closed position, and a clutch for rendering said door opening mechanism operative, said clutch being controlled by said latching mechanism.

4. A truck comprising a chassis, a tiltable body mounted on said chassis, a door for said body, means for tilting said body to dump material therefrom through the opening provided by said door, door opening mechanism operable through hoisting movement of said body, latching mechanism for said door, and a clutch for rendering said door opening mechanism operative, said clutch being actuated by said latching mechanism.

5. A truck comprising a chassis, a tiltable body mounted on said chassis, means for hoisting said body to an angle to dump material therefrom through the rear end thereof, a door for said rear end, and means for opening and closing said door, said means comprising a shaft, co-acting linkage and leverage mechanism connecting said shaft with the chassis and said door whereby the latter is opened through relative movement between the chassis and body when said body is hoisted, and a clutch for selectively disconnecting said shaft from said door.

6. A truck comprising a chassis, a tiltable body mounted on said chassis, means for hoisting said body to an angle to dump material from the rear end thereof, a door for said rear end, latching mechanism for said door, and positively acting means for opening and closing said door through relative movement between the chassis and body, said means comprising a shaft, leverage and linkage mechanism connecting said shaft with the chassis and said door, a clutch operatively associated with said shaft for selectively rendering it operative and inoperative in its door-operating function, and means connecting said latching mechanism with said clutch for operating the latter through the unlatching and latching of said door.

7. A truck comprising a chassis, a tiltable body mounted on said chassis, means for hoisting said body to an angle to dump material therefrom through the rear end thereof, a door for said rear end, and means for opening and closing said door through hoisting of said body, said means comprising a shaft, leverage and linkage mechanism connecting said shaft with the chassis and said door, and a clutch operatively associated with said shaft for selectively rendering it operative and inoperative in its door-operating function, and manually-controlled means for actuating said clutch.

ANDREW K. BRUMBAUGH.